Dec. 26, 1944. G. FASSIN 2,365,690
RAPID WINDING MECHANISM FOR ROLL FILM CAMERAS
Filed April 4, 1942

Inventor
Gustave Fassin

By Strauch & Hoffman
Attorneys

Patented Dec. 26, 1944

2,365,690

UNITED STATES PATENT OFFICE 2,365,690

RAPID WINDING MECHANISM FOR ROLL FILM CAMERAS

Gustave Fassin, Grosse Pointe, Mich., assignor to Argus, Incorporated, a corporation of Michigan Application April 4, 1942, Serial No. 437,700

4 Claims. (Cl. 242—71)

My invention relates to roll film cameras, and is particularly concerned with mechanism for rapidly and accurately advancing film in roll film cameras.

In known roll film cameras, especially those of the type commonly referred to as miniature cameras which are adapted to obtain a series of exposures on a roll of film, the film is usually advanced from its exposure position at the exposure aperture toward the winding spool through manipulation by the operator of a winding key on the exterior of the camera case. The winding key may be drive-connected to the winding spool or a film advancing sprocket, but in either event the operator is generally required to rotate the winding key through a multiplicity of turns in order to advance the film the correct amount after each exposure. This winding operation requires effort and takes time, and the operator often misses many good pictures during the winding period.

It is a major object of the invention to provide a novel mechanism for rapidly and accurately advancing film in a roll film camera.

A further object of the invention is to provide a novel rapid winding mechanism for a roll film camera whereby the film may be advanced properly and accurately at the exposure aperture by a single short stroke of the operator's hand.

A further object of the invention is to provide a novel rapid film winding mechanism connected to actuate a film exposure counter in a roll film camera.

A further object of the invention is to provide a rapid film winding mechanism connected to drive the film winding spool and embodying novel compensating arrangements insuring that the film is advanced substantially the same linear amount after each exposure regardless of the increasing diameter of the wound film roll on the winding spool.

Figure 1:
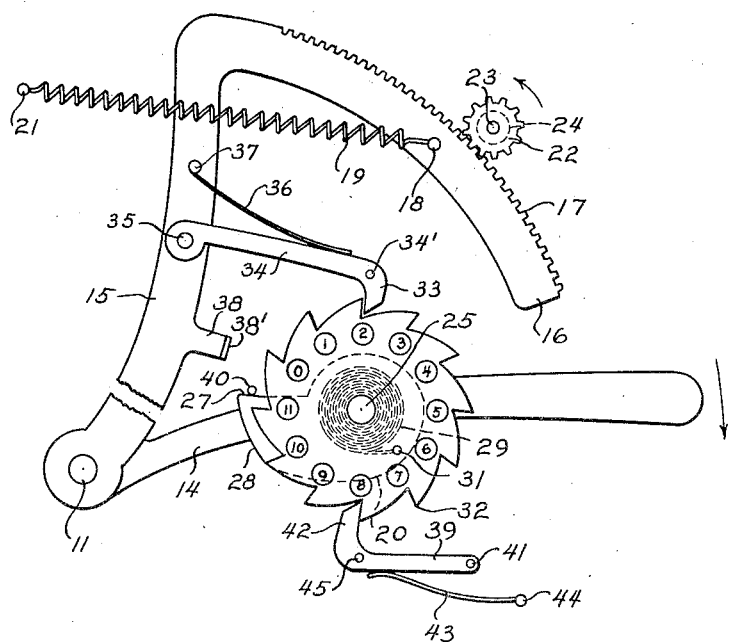
Figure 2:
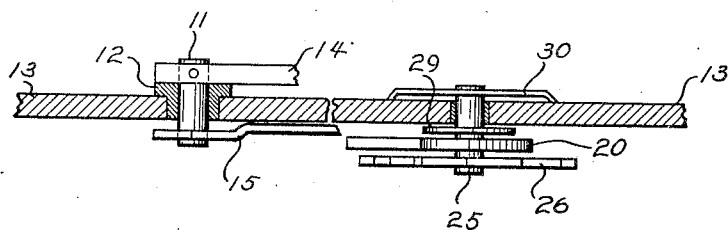

Further objects of the invention will presently appear as the description proceeds in connection with the appended claims and the annexed drawing in which Figure 1 illustrates the rapid winding mechanism of my invention and its connection to the exposure counter; and Figure 2 is a fragmentary view illustrating the rapid rewind lever mounted on the camera wall, and details of the counter device.

Referring to the drawing, a stub shaft 11 is journaled in a suitable bearing support 12 in a camera casing wall 13.

Exteriorly of wall 13, a lever 14 is non-rotatably mounted at one end upon shaft 11, so that lever 14 is pivotally mounted on the camera casing. Lever 14 is preferably located so as to be easily and conveniently accessible to the operator's hand, even when he is sighting through the view finder or range finder, so that he may be enabled to make quickly successive exposures without moving the camera from alignment with the subject.

Interiorly of the camera, a lever 15 is non-rotatably mounted at one end upon shaft 11. At its free end, lever 15 is provided with an arcuate rack bar 16 having a row of teeth 17 along a portion of its outer circumference. Rack bar 16 may be integral with lever 15, as shown, or may be a separate member securely fastened to lever 15.

A pin 18 rigid with bar 16 has secured thereto one end of a tension spring 19. The other end of spring 19 is anchored to a pin 21 rigid with a spaced portion of camera wall 13.

Rack teeth 17 are meshed with a gear 22 non-rotatably mounted upon a shaft 23 suitably rotatably mounted in the camera. Shaft 23 is connected to drive the film winding spool (not shown) through suitable drive connections including a one-way drive or clutch, indicated at 24, which may be of any suitable design such as the clutch illustrated in United States Letters Patent No. 1,422,131. Clutch 24 is arranged to transmit rotation to the winding spool when the manual lever 14 is rotated clockwise (Figure 1) thereby causing gear 22 to rotate counterclockwise as shown by the arrow. When gear 22 rotates clockwise, as when lever 14 is being returned by spring 19, no rotation is transmitted to the winding spool.

The winding spool may be concentric with shaft 23, or may be offset therefrom and connected to clutch 24 by suitable gearing or like motion transmitting mechanism. Since the mechanical details of the clutch and such drive connections, other than above described, are not part of the invention, further description thereof is unnecessary.

An exposure countershaft 25 is suitably rotatably supported in the camera casing parallel to shaft 11. A counter ratchet disc 26 is non-rotatably secured upon shaft 25, and a cam 20 having a radial face 27 and a circumferential face 28 of uniformly changing height connecting the ends of said radial face 27 is also rigid with shaft 25. A flat spring 29 is coiled concentrically about shaft 25, with one end fixed to shaft 25 and its other end anchored upon a pin 31 rigid with the camera casing. Spring 29 constantly urges rotation of shaft 25 clockwise in Figure 1. As shown in Figure 2, shaft 25 extends exteriorly of the camera and carries a counter dial 30 bearing the exposure numbers and having a suitable index. These numbers are marked on disc 26 in Figure 1 for convenience in understanding the invention.

Disc 26 is formed with inclined ratchet teeth 32, adapted to be engaged by a suitably shaped tooth 33 on the end of an advancing pawl arm 34 which is pivoted at 35 on lever 15. A flat spring 36 anchored to lever 15 at 37 bears on the upper edge of pawl arm 34 to urge tooth 33 toward disc 26.

A pin 34' is provided on arm 34, for a purpose to be described.

Below arm 34, lever 15 is provided with a stop projection 38 having a tab 38' adapted to engage cam surface 28 under certain conditions of operation as will hereinafter be described. A stop pin 40 rigid with the camera wall is adapted to engage cam face 27 and limit clockwise rotation of shaft 25 as will be described.

A blocking pawl arm 39 is rotatably mounted on a fixed pivot 41 on the camera casing, and is formed with a tooth 42 adapted to engage ratchet teeth 32 substantially diametrically opposite the advancing pawl. A spring 43, anchored at one end 44 on the camera casing, bears on the lower edge of arm 39 and urges the blocking pawl toward the ratchet teeth. A rigid pin 45 is provided on pawl arm 39.

Operation

When it is desired to quickly advance the film in the camera toward the winding spool, as after an exposure has been made and a fresh unexposed area of the film is to be positioned before the exposure aperture, the operator simply presses down on lever 14 which is conveniently accessible outside the camera. This causes clockwise rotation (Figure 1) of shaft 11 and lever 16 against the pull of spring 19. This clockwise movement of rack bar 16 results in counterclockwise rotation of gear 22 which drives the film spool to wind the film thereupon. The film is thereby advanced across the exposure aperture.

Since lever 15 is relatively long so that rack bar 16 is located a substantial distance from the center of shaft 11, a small angular displacement of lever 15 produces greatly amplified angular rotation of gear 22. Hence, when the operator delivers a short stroke of his hand to turn lever 14, gear 22 and the drive connection to the winding spool are actuated to speedily advance the film past the aperture while rapidly winding the leading portion on the winding spool.

The linear distance advanced by the film depends on the angular stroke of lever 15, and cam surface 28 and stop projection 38 cooperate to limit and define the permissible stroke of lever 15 when manual lever 14 is depressed.

If gear 22 were connected to rotate a film sprocket, or a similar film advancing member, which arrangement is within the scope of this phase of the invention, the angular stroke of lever 15 could be made constant to thereby insure that the same linear amount of film is drawn past the aperture each time lever 14 is depressed.

However, whereas in the preferred construction herein, gear 22 drives the take-up or winding spool, compensation must be made for the increasing diameter of the roll as the amount of wound film increases. Rotation of an empty spool through a selected angle produces a smaller linear movement of the film than rotation of a partially wound spool through the same angle. Hence, compensation must be made to insure uniform linear movement of the film upon each manipulation of lever 14.

As the parts are shown in Figure 1, the winding spool is substantially empty, and the film is ready for the first exposure. Under these conditions the counter dial is in zero position with spring 29 urging cam face 27 against stop pin 40. This zero position is initially attained by the operator simultaneously manipulating pins 34' and 45 to rotate pawls 34 and 39 counterclockwise away from disc 26 to permit spring 29 to rotate shaft 25 and the parts thereon clockwise until stopped by pin 40. This simultaneous outward displacement of pawls 34 and 39 may be provided by a suitable rotatable double eccentric device connected by pivoted links to both pins 34' and 45 for causing the pins to move in opposite directions when the eccentric is rotated. This type of device is well known and is not illustrated.

The first exposure is made, and the film then advanced by depressing and releasing lever 14 as explained. With the parts in the position of Figure 1 and the winding spool being almost empty, lever 15 is permitted maximum angular stroke because inwardly projecting tab 38' on stop projection 38 is contacted by the most shallow part of cam face 28.

Release of lever 14 by the operator permits spring 19 to return levers 14 and 15 to initial position, and this return movement is utilized to actuate the exposure counter and compensating stop cam. As lever 15 is moving clockwise in its film advancing stroke, tooth 33 of the advancing pawl 34 slides over the inclined back of the ratchet tooth 32 immediately before it, until at the end of the stroke of lever 15 tooth 33 has advanced clockwise to the next tooth 32 and is pressed thereagainst by spring 36. The parts are of such size and design that the maximum stroke of lever 15 causes tooth 33 to move along the periphery of ratchet disc 26 an angular distance less than two teeth 32, while minimum stroke of lever 15 causes tooth 33 to move therealong at least an angular distance of one tooth 32. This insures that shaft 25 rotates the same amount each time lever 14 is depressed. Blocking pawl 39 prevents any possible clockwise movement of disc 26 by pawl 34.

As lever 15 returns, therefore, pawl 34 positively effects counterclockwise rotation of disc 26 to the extent of one tooth. This rotation of disc 26 is permitted by pawl 39, but opposes and partially winds spring 29. The counter dial on the camera wall will also have been rotated with respect to a suitable index to indicate one exposure.

The above described counterclockwise movement of shaft 25 turns the cam to present a less shallow portion of cam surface 28 opposite stop projection 38, so that when lever 14 is depressed to advance the film after the second exposure, the angular stroke of lever 15 is shortened to compensate for the increased diameter of the wound film on the winding spool.

The above operations are repeated each time an exposure is made. The stroke of lever 15 is uniformly shortened as the diameter of the wound film on the winding spool increases, until minimum stroke is obtained when the spool is full. The exposure dial on shaft 25 is also angularly advanced a unit by the return stroke after each film advance, so that the operator may know at a glance how many exposures have been made. While only 12 exposures are indicated on the counter, obviously the invention is adapted to cover mechanism for obtaining any desired number of exposures.

The parts are so sized, spaced and designed that advancing pawl 34 causes the counter dial to advance one unit regardless of the length of stroke of lever 15. In the illustrated embodiment some of the parts are shown somewhat distorted as to size and spacing in order to more clearly illustrate the principles of the invention, but adaptation of such principles to suit the mechanisms of various type cameras is simply a matter of mechanical skill.

Each time a fresh roll of film is placed in the camera, the counter may be set for zero, by manipulating pawls 34 and 39 to release shaft 25 to the returning action of spring 29 as above explained.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a camera having a film winding spool coupled by a unidirectional clutch to a drive gear, a pivoted toothed sector meshing directly with said gear and operable to advance said spool when it is rocked in one direction, and to idly rotate said gear when rocked in the opposite direction; a lever arm operable to rock said sector in said one direction; resilient means urging said sector in the opposite direction; a shaft journalled in said camera in cooperative relationship to said sector; an exposure counter and a cam mounted for synchronous rotation with each other on said shaft; a fixed abutment on said sector so disposed as to contact said cam and stop said sector when the latter is rocked in said one direction; means for automatically advancing said cam and counter step-by-step in response to rocking of said sector, to compensate for the increasing diameter of the film wound on said spool, comprising means operable to rock said cam and counter through a small angle when said sector is moving in said opposite direction under the influence of said resilient means, and means for preventing retrograde rotation of said cam and counter.

2. In a camera having a film winding spool coupled by a unidirectional clutch to a drive gear; a shaft journalled for rocking movement in said camera and projecting to the exterior thereof; an operating lever secured to said shaft on the exterior of said camera; a toothed gear sector mounted on said shaft on the interior of said camera and constantly meshing with said drive gear; resilient means urging said shaft-lever-sector assembly to inoperative position, said sector being operable to drive said gear and clutch in a direction to advance said spool when said sector is rocked toward operative position against the action of said resilient means, and to idly rotate said gear when rocked toward inoperative position; an exposure counter and a cam mounted for synchronous rotation in said camera in cooperative relationship to said sector; an abutment face on said sector adapted to contact said cam and arrest movement of said sector toward operative position; and means for automatically advancing said exposure counter and cam step-by-step in response to successive actuation of said sector; to indicate the exposures made and to also compensate for the increasing diameter of the film roll, comprising means for advancing said counter and cam through a small angle when said sector is returning to inoperative position under the influence of said resilient means.

3. The camera construction defined in claim 2, wherein said means for automatically advancing said exposure counter and cam comprises a pawl carried by said sector and resiliently urged into engagement with ratchet means on said counter and cam assembly.

4. In a camera having a film winding spool coupled by a unidirectional clutch to a drive gear; a shaft journalled for rocking movement in a wall of said camera and projecting therethrough to the outside thereof; an actuating lever secured to said shaft exteriorly of said wall; a toothed sector secured to said shaft interiorly of said wall and constantly meshing with said drive gear; resilient means urging said shaft toward inoperative position; said sector being operable to drive said gear and clutch in a direction to advance said spool when said sector is rocked toward operative position against the action of said resilient means, and to idly rotate said gear when it is returning to inoperative position under the influence of said resilient means; a second shaft journalled in said camera wall and rigidly carrying a cam interiorly of said wall and an exposure counter exteriorly of said wall; abutment means on said sector adapted to contact said cam and arrest movement of said sector toward operative position; a ratchet wheel rigidly mounted on said second shaft; pawl means carried by said sector and cooperating with said ratchet wheel to automatically advance said second shaft step-by-step when said sector is returning to inoperative position under the influence of said resilient means, and to idly ride over said ratchet wheel when said sector is moving toward operative position, said cam being so contoured as to cause said sector to make successively smaller strokes, to compensate for the increasing diameter of the film wound on the roll; and means for preventing retrograde rotation of said second shaft.

GUSTAVE FASSIN.